United States Patent [19]
Odagiri

[11] 3,987,483
[45] Oct. 19, 1976

[54] MAGNETIC RECORDING DISK AND APPARATUS WITH SLOW MOTION MODE
[75] Inventor: Yoichi Odagiri, Yokohama, Japan
[73] Assignee: Sony Corporation, Tokyo, Japan
[22] Filed: Nov. 14, 1974
[21] Appl. No.: 523,919

[30] Foreign Application Priority Data
Nov. 22, 1973   Japan.................... 48-134923[U]

[52] U.S. Cl.................... 360/10; 360/135; 360/56; 360/35; 427/128
[51] Int. Cl.².................... H04N 5/78; G11B 5/82
[58] Field of Search.............. 360/10, 35, 135, 77, 360/56, 131; 427/128, 130, 131, 132

[56] References Cited
UNITED STATES PATENTS

| 2,796,359 | 6/1957 | Speed | 360/131 |
|---|---|---|---|
| 3,117,065 | 1/1964 | Wootten | 360/134 |
| 3,509,274 | 4/1970 | Kihara | 360/10 |

FOREIGN PATENTS OR APPLICATIONS

| 19,488 | 1971 | Japan | 360/10 |
|---|---|---|---|
| 19,487 | 1971 | Japan | 360/10 |

OTHER PUBLICATIONS
Video Tape Recording, by J. Bernstein, c. 1960, p. 89.
Orienting CrO₂ Particles on the Surface of a Recording Disk. by R. Comstock, IBM Tech. Disc. Bul., vol. 14, No. 7, Dec. 1971.

Primary Examiner—Alfred H. Eddleman
Assistant Examiner—Alan Faber
Attorney, Agent, or Firm—Lewis H. Eslinger; Alvin Sinderbrand

[57] ABSTRACT

Apparatus for recording on and reproducing signals from a magnetic disk having the capability of reproducing the signals in a slow motion operation with a desirable signal-to-noise ratio. The magnetic disk has a thin non-magnetic carrier and magnetic anisotropic, ferromagnetic, acicular particles bonded to the carrier and magnetically oriented substantially parallel to each other and to the surface of the disk. The apparatus includes a first transducer for recording the signals, such as video signals, on a spiral track on the disk. During a normal playback mode, this first transducer reproduces the recorded signals from the spiral track. During a slow motion playback mode the first transducer scans a second spiral track across the record disk which generally, but not precisely, corresponds to the recorded spiral track. Nevertheless, there are some portions of the second spiral track which substantially correspond, or more closely coincide, with the recorded spiral track than do other portions of the second spiral track. These more closely coinciding portions of the second spiral track have a predetermined relationship with respect to the magnetically oriented particles of the record disk so that the response of the signal reproduced by the first transducer as it scans along the second spiral track is uniform for both the more closely coinciding portions and the other portions of the second spiral track. In addition, a second transducer is provided for re-recording the reproduced signals in a predetermined track on the record disk, at least during a slow motion playback mode and these re-recorded signals are played back and displayed as a slow motion video picture.

9 Claims, 9 Drawing Figures

MAGNETIC RECORDING DISK AND APPARATUS WITH SLOW MOTION MODE

BACKGROUND OF THE INVENTION

1. Field of the Invention

The present invention relates to a magnetic disk medium and more particularly to a magnetic video recording disk in which magnetic particles are oriented substantially uniformly relative to each other and to the surface of the disk. The invention further relates to magnetic recording and reproducing apparatus for use with a magnetic recording disk to reproduce a picture in slow motion while minimizing so-called guard band noise by minimizing displacements of the path of the transducer from the track being played back.

2. The Prior Art

In U.S. Pat. No. 3,509,274 there is disclosed apparatus for recording and playing back video signals using a disk with magnetic material thereon as the recording medium. A motor causes the disk to rotate and a lead screw is coupled to the rotating apparatus and to the main recording and playback transducer to cause the latter to follow a spiral track while recording video information on the disk. The transducer is caused to follow a slightly different path during playback of the recorded signals, the path being generally similar to one section of the track on which the signals are recorded but differing slightly therefrom and having certain portions in which the track and the path coincide more closely than at other portions. The apparatus has additional transducers that follow only a circular track and are connected to the main transducer at least during playback to record the signal reproduced by the main transducer during such times and a further transducer to playback signals recorded on the circular track. Such signals may be played back repeatedly while the main transducer is moved radially across the recorded part of the disk at a slower rate than normal to effect slow motion playback of signals on the spiral track. This slow radial movement causes the main transducer to follow a tighter spiral track than the normal one. The operation of the main transducer is controlled so that it supplies signals to the additional transducers primarily only when the main transducer is on those parts of its slow motion track that correspond more nearly to the track on which the signals were originally recorded, thereby providing as good a signal-to-noise ratio as possible.

However, in the prior patent, it was not recognized that the orientation of the magnetic medium on the disk affects the operation of the apparatus, especially during playback. Therefore, the prior patent shows no means for making sure that the area in which the track followed by the main transducer during slow motion playback most closely coincides with the original recording track at positions specifically related to orientation of the magnetic particles on the surface of the recording disk.

Accordingly, it is one object of the present invention to provide a novel magnetic recording medium.

It is another object of the present invention to provide a magnetic recording disk in which magnetic particles are orientated uniformly in a predetermined direction.

It is a further object of the present invention to provide magnetic recording and playback apparatus for use with a specific magnetic recording medium to produce a slow motion picture with less noise, particularly of the so-called guard band type of noise.

It is a further object of the present invention to provide magnetic recording and reproducing apparatus for use with a magnetic recording disk and in which the apparatus produces a picture of good quality from information recorded near the center of the disk so that deterioration of the reproduced picture will not be noticeable.

It is a still further object of the present invention to provide improved magnetic recording and reproducing apparatus using a magnetic disk as the recording medium to reproduce a picture in slow motion with better quality than has been possible heretofore.

These and other objects, features, and advantages of the present invention will be apparent from the following description taken in conjunction with the accompanying drawings.

SUMMARY OF THE INVENTION

According to the present invention there is provided a magnetic recording disk that comprises a thin, non-magnetic carrier sheet that has magnetically anisotropic, ferromagnetic particles firmly bonded thereto and oriented to be substantially parallel to each other and substantially parallel to the surface of the disk.

Apparatus is provided in accordance with the invention to record and reproduce signals on the foregoing magnetic disk. The apparatus includes a transducer for recording and playing back video signals on a first track on the disk. During playback the transducer follows a track generally similar to the recording track and coinciding more closely therewith at certain points than at other points. The apparatus that rotates the disk includes means to select the position of the transducer during playback so that those portions that correspond most closely with the track of the originally recorded signals are specifically selected to be related to parts of the disk in which the magnetic particles have a specific orientation that minimizes differences in the amplitude response of the played back signal as the playback transducer traces out the playback track.

DETAILED DESCRIPTION OF THE PREFERRED EMBODIMENT

Figure 1:
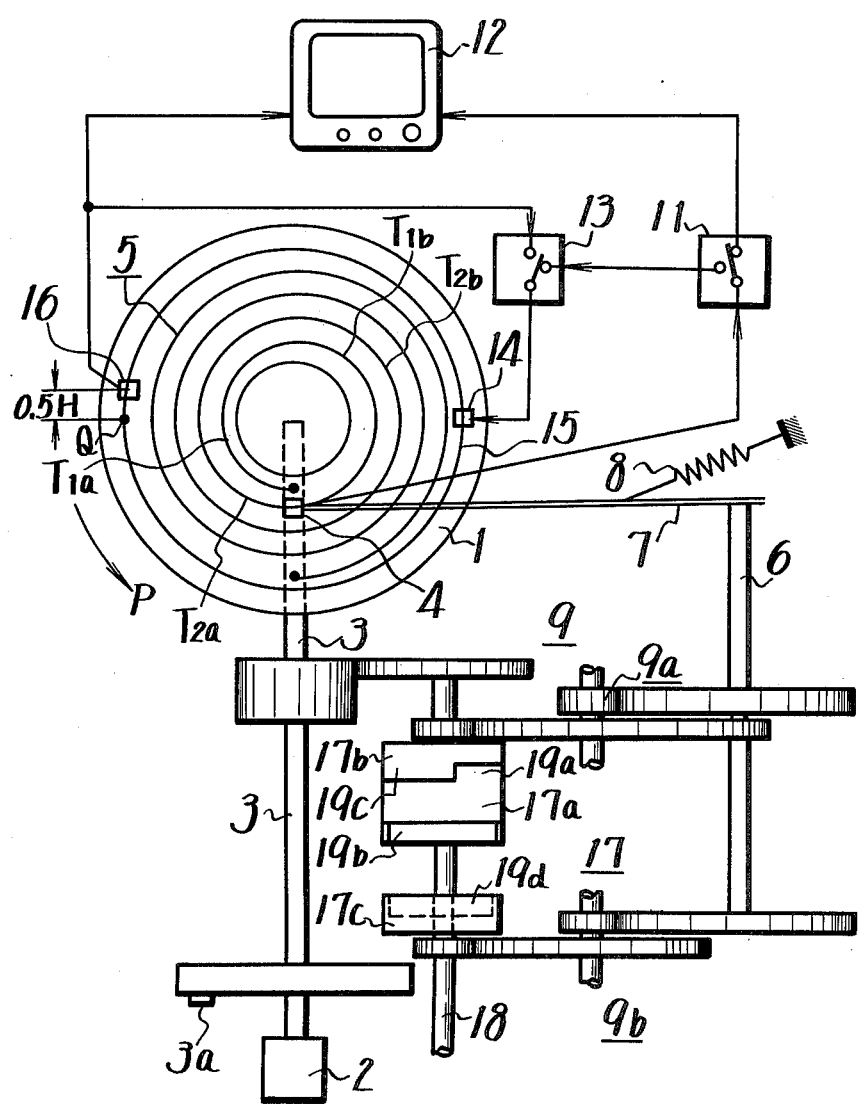
FIG. 1 is a schematic representation of one embodiment of magnetic recording and playback apparatus for use with a magnetic disk according to the present invention.

The apparatus in FIG. 1 shows a magnetic recording disk, or sheet, 1 rotated by a motor 2. The drawing is schematic in that the disk is actually perpendicular to the axis of the motor but is shown in FIG. 1 as if it were parallel to the axis in order to illustrate the novel relationships of the disk and the apparatus better. A shaft 3 extends from the motor 2 and is attached to the disk, normally by a turntable (not shown). The shaft 3 causes the disk to rotate counterclockwise as shown by an arrow P. A magnetic head, or transducer, 4 is located so that it can contact the magnetic disk 1 so that as the transducer 4 moves in a generally radial direction across the surface of the disk, it will trace out a spiral magnetic track thereon. The motor 2 rotates at a speed of 30 revolutions per second so that as the disk 1 is rotated one turn, video information corresponding to one frame will be recorded on the track 5. In accordance with known techniques, a servo system may be provided to record a vertical synchronizing signal on the disk, but for the sake of simplicity, the servo system is not shown in this drawing.

Figure 2A:
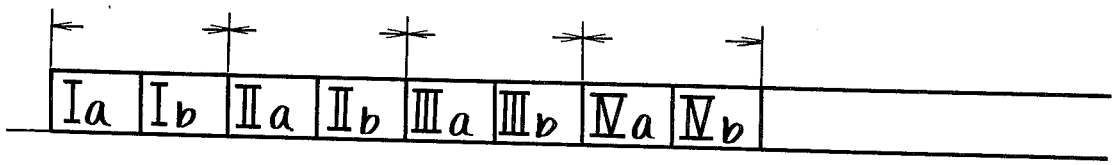
FIGS. 2A and 2B are diagrams of video signals used for explaining the apparatus shown in FIG. 1.

FIG. 2A is a chart representing the occurrence of the first and second fields of several frames of the usual types of interlaced television signal. The two fields that make up the first frame are identified by the reference characters $I_a$ and $I_b$. Those that make up the second and subsequent frames are identified by reference characters $II_a - IV_b$. In accordance with the specified rotational speed of the disk 1, an odd-numbered field, for example the field $I_a$ in the first frame of the video signal shown in FIG. 2A is recorded on the disk 1 as a substantially semicircular magnetic track $T_{1a}$, and an even-numbered field, for example the field $I_b$ of the first frame, is recorded on a substantially semicircular magnetic track $T_{1b}$, that follows the track $T_{1a}$. The next odd-numbered field, which is the field $II_a$ of the second frame of the video signal is recorded on the next substantially semicircular magnetic track $T_{2a}$ that follows the track $T_{1b}$ and is spaced radially outwardly from the track $T_{1a}$. Subsequent fields and frames are recorded in the same pattern across the surface of the disk 1 as the transducer 4 creates the spiral magnetic track 5.

The apparatus in FIG. 1 also includes a shaft 6 that has a rod 7 attached to it. The transducer 4 is attached to the free end of the rod 7. A spring 8 exerts a force on the rod 7 that tends to move the rod so that the transducer 4 is at its initial position near the center of the disk to be ready to start recording the first part of the first track $T_{1a}$. The shaft 6 is coupled to the rotary shaft 3 by means of a gear mechanism 9. This mechanism causes the pivotal movement of the shaft 6 and the rod 7 to proceed at a rate that corresponds to the speed of rotation of the shaft 3 to produce a spiral track 5 of the desired radial spacing between adjacent turns. A pulse generator 3a forms part of a servo system and produces a pulse signal that represents a specific angular position of the rotary shaft 3.

During reproduction of signals from the disk 1, the magnetic head 4 is moved from a position that corresponds to the innermost end of the spiral track 5 toward the outermost end of that track and in synchronism with the rotation of the disk to cause the transducer to reproduce a video signal to be applied through a single-pole, double-throw switch 11 to a monitor 12 to be displayed on the screen of the monitor as a reproduced picture. As long as the transducer 4 moves at the same speed and scanning phase during playback as during recording, the reproduced picture on the monitor 12 is a normal picture. However, if the transducer 4 is moved in a relatively radial direction with respect to the disk 1 at a speed lower than the radial speed of the transducer during recording, a slow motion picture can be reproduced. For example, if the transducer 4 is moved at such a speed that the transducer moves correctly from a position on the track $T_{1a}$ to the track $T_{2a}$ during a time interval within which the disk 1 is rotated by several turns, for example, 7 turns, the reproduced image on the screen of the monitor 12 will appear to be a slow motion image having a repetition rate 1/7 the normal repetition rate.

The reference just made to the correct movement of the transducer 4 relates to the fact that there is a space between adjacent turns of the track 5, and this space is called guard band space. It prevents a reproducing transducer that is supposed to be picking up signals from only one track from picking up signals from an adjacent track. As the transducer 4 traverses this guard band space during slow motion reproduction, for example, in going from the track $T_{1a}$ to the track $T_{2a}$, it picks up less and less of the signal recorded on the track $T_{1a}$ and its continuation track $T_{1b}$, thereby reducing the amplitude of the signal being reproduced. This automatically reduces the signal-to-noise ratio of the reproduced signal. As the path being followed by the transducer 4 during reproduction moves more nearly into congruence with the track $T_{2a}$, the amplitude of the signal, and thus the signal-to-noise ration increases.

In FIG. 1 a gate circuit 13 electrically equivalent to a single-pole, double-throw switch has one of its poles connected to a pole of the switch 11 so that signals from the transducer 4 can be switched to the gate circuit 13 when they are not being reproduced on the monitor 12. The movable arm, or its equivalent, in the gate circuit 13 is connected to a transducer 14 that does not move radially but follows a circular track 15 near the outer perimeter of the magnetic recording disk 1. A fixed, reproducing, magnetic transducer 16 also follows the same track 15 as the transducer 14. During playback, information recorded on the track 15 and reproduced by the transducer 16 can be applied to the monitor 12 and can also be applied to another terminal of the gate circuit 13. By suitable operation of the switch 11 and the gate circuit 13, each of the field signals $I_a$, $I_b$, $II_a$, $II_b$, ... shown in FIG. 2A and representative of the signals recorded on the spiral track 5 can be recorded on the circular track 15 twice during one revolution of the disk 1. To take a specific example, the odd field $I_a$ of the first frame recorded in the semicircular track portion $T_{1a}$ on the disk 1 and reproduced by the transducer 4 is connected through the switch 11 and the gate circuit to the transducer 14 to be recorded on a semicircular portion of the track 15 during the first 1/60 of a second. Thereafter, the gate circuit 13 actuated so that the reproducing transducer 16 reproduces the field recorded on the first half of the track 15 and sends this reproduced signal back to the transducer 14 to record the same signal on the second half of the track 15. Thus the total signal recorded on the track 15 will constitute the single field signal $I_a$ recorded twice.

If the reproducing transducer 16 were located directly opposite the transducer 14, which is the same as saying that these transducers are 180° apart, the horizontal synchronizing signals between the two field signals on the track 15 would be incorrect. For example, when an odd field signal is recorded, it includes signals corresponding to the first 262.5H of a 525 line frame, where H represents the horizontal line interval. Normally, before the next field signal begins to be reproduced, there is a phase shift, or displacement, of 0.5H, or ½ of a horizontal line interval in order to provide for the proper interlacing relationship. To avoid this in the apparatus shown in FIG. 1, it is preferred that the reproducing transducer 16 be located at a position shifted along the track 15 by a distance that corresponds to 0.5H at the regular rotational speed of the disk 1; the displacement being measured from a point Q diametrically opposite the recording transducer 14. The direction in which this shift is made is counter to the direction of rotation of the disk 1, which means that it is in the opposite direction from that indicated by the arrow P. With such displacement, a slow motion picture can be provided in properly interlaced form to be reproduced.

If a slow motion picture is to be reproduced by the apparatus shown in FIG. 1, the transducer 4 is shifted 90° around the disk 1 relative to the position in which an ordinary television image is reproduced. For this purpose, a clutch mechanism 17 is provided in association with the gear mechanism 9 that couples the rotary shaft 3 to the shaft 6. In connection with the clutch mechanism 17 there is provided a gear mechanism 9a, which is used for reproducing an ordinary television picture, and a gear mechanism 9b used for reproducing a slow motion picture. Typically, the reproduction gear ratio between the mechanisms 9a and 9b are 7:1. The clutch mechanism 17 includes a fixed clutch plate 17b engaged by the gear mechanism 9a and rotatably supported by a shaft 18 at a fixed position. The clutch mechanism includes another fixed clutch plate 17c to be engaged by the gear mechanism 9b and rotatably supported by the shaft 18 at a fixed position. Between the clutch plates 17b and 17c is a rotatable clutch plate 17a fixed to the shaft 18 but capable of being shifted along the shaft 18 to engage either of the fixed clutch plates 17b or 17c. Step portions 19a and 19b, which are walls that extend in a direction parallel to the axis of the shaft 18, are formed on portions of the rotatable clutch plate 17a that face the fixed clutch plates 17b and 17c, respectively. The step portions 19a and 19b are so formed that there is an angular distance, for example, 90° between them. The surfaces of the fixed clutch plates 17b and 17c that face the clutch plate 17a also have matching step portions 19c and 19d, respectively, to engage the step portions 19a and 19b.

When the motor 2 is operated at the start of the playback of the disk 1, the transducer 4 contacts the disk at the inner end of the track 5 in response to the force of the spring 8. If the rotatable clutch plate 17a of the clutch mechanism 17 is engaged with the fixed clutch plate 17b, the rotation of the motor is transmitted through the shaft 18 and through the clutch plate 17a by way of the step portion 19a to the step portion 19c of the fixed clutch plate 17b. The rotary motion is thus transferred to the gear mechanism 9a and from there to the shaft 6 to cause the rod 7 to pivot. This moves the transducer 4 from its inner position along a generally radial path to trace out the spiral magnetic track 5.

On the other hand, if the rotatable clutch plate 17a is moved toward the fixed clutch plate 17c in order to produce a picture in slow motion on the screen of the monitor 12, the rotatable clutch plate 17a would have to rotate about 90° to bring the step portion 19b into engagement with the step portion 19d of the fixed clutch plate 17c. After that engagement takes place, the rotation of the shaft 18 will be applied to the gear mechanism 9b. In this manner the starting point for the transducer 4 is shifted by about 90° as compared with the position of the transducer for television reproduction at normal speed. When the rotatable clutch plate 17a is shifted from one of the fixed clutch plates 17d or 17c to the other, the starting point of the magnetic transducer 4 for scanning the disk 1 changes by an amount that corresponds to the angular distance between the steps of the step portions 19a and 19b of the rotatable clutch plate 17a. In this description the relative position, or starting point, of the transducer 4 with respect to the magnetic disk 1 is referred to as the scanning phase.

Figure 2B:
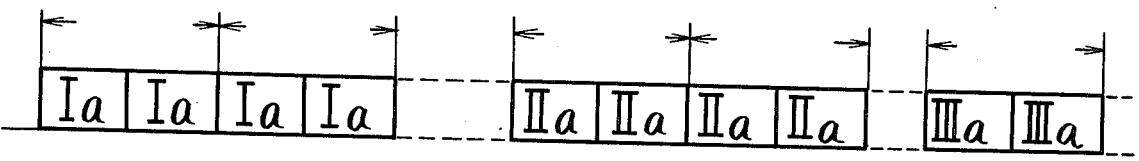

When a slow motion picture is to be reproduced on the screen of the monitor 12, field signals during the slow motion interval, for example the first field signal $I_a$ shown in FIG. 2A, are continuously recorded on the track 15 of the disk 1. This is shown in FIG. 2B which indicates that each of the first set of slow motion frames, which are identified as $SM_{1a}$ and $SM_{1b}$, is now made up of two successive fields $I_a$ and $I_b$. However, these fields $I_a$ are scanned repeatedly, for example 7 times, in being applied to the monitor 12. Similarly, the first field signals $II_a$, $III_a$, etc. of the second, third, and later frames are also recorded twice on the track 15 to form the slow motion frames $SM_{2a}$, $SM_{2b}$ and $SM_{3a}$, and are played back the desired number of times to produce a slow motion picture on the monitor 12.

Figure 3:
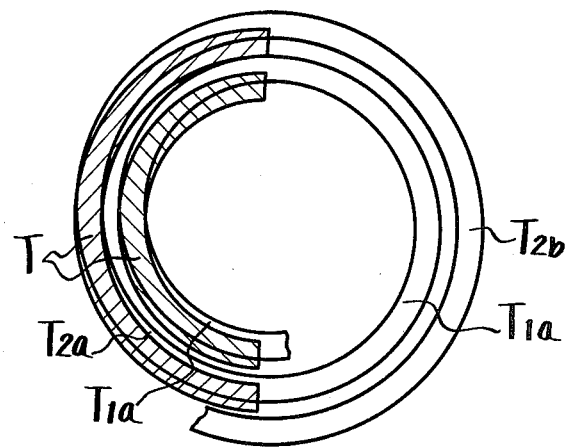
FIG. 3 is a diagramatic view of parts of magnetic tracks formed on a disk according to the present invention.

FIG. 3 shows the relative positions of sections $T_{1a} - T_{2b}$ of the spiral track on the disk 1 in FIG. 1, and also shows sections of semicircular traces T followed by the transducer 4 when the disk 1 in FIG. 1 is scanned slowly to make a slow motion picture. The transducer 4 is shifted by about 90°, as stated previously, on the disk 1 as compared to its position for reproducing a normal speed picture. As a result of this shift, certain points of sections $T_{1a}$ and $T_{2a}$ of the spiral track coincide most closely with the semicircular traces T. In fact, the traces cross these sections of the track at a specific angular location.

Figure 4A:
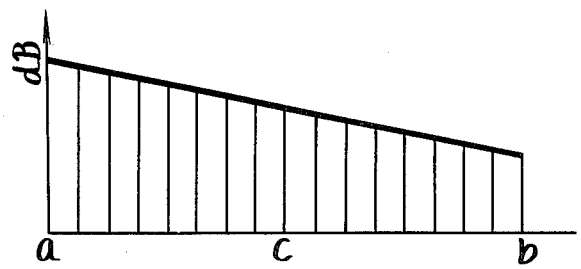
FIGS. 4A and 4B are graphs of output characteristic curves of signals reproduced from a magnetic disk.
Figure 4B:
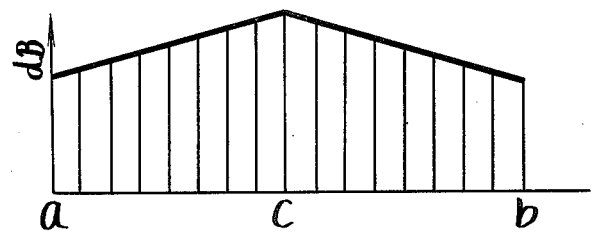

The reason why the transducer 4 is shifted 90° with respect to the magnetidisk 1 will be described with reference to FIGS. 3 and 4. If the transducer 4 scans the track section $T_{1a}$ from the beginning thereof, the reproduced signal starts with a certain amplitude. The starting amplitude is indicated in FIG. 4A at the point a. As the disk rotates, the amplitude of the reproduced signal decreases gradually through a level c to a level b. By shifting the transducer 4 so that it starts to scan the track section $T_{1a}$ from a position which is ahead of the starting point of the track section $T_{1a}$ by 90°, the initial output is reduced, as shown in FIG. 4B. However, the output builds to a maximum as the transducer 4 reaches the central point of the track section $T_{1a}$ at which the track section and the semicircular trace T coincide best. This is indicated by the point c on the graph in FIG. 4B. Thereafter, the amplitude of the reproduced signal decreases to the level indicated at the point b in FIG. 4B as the transducer diverges from the recorded track section $T_{1a}$.

Figure 5:
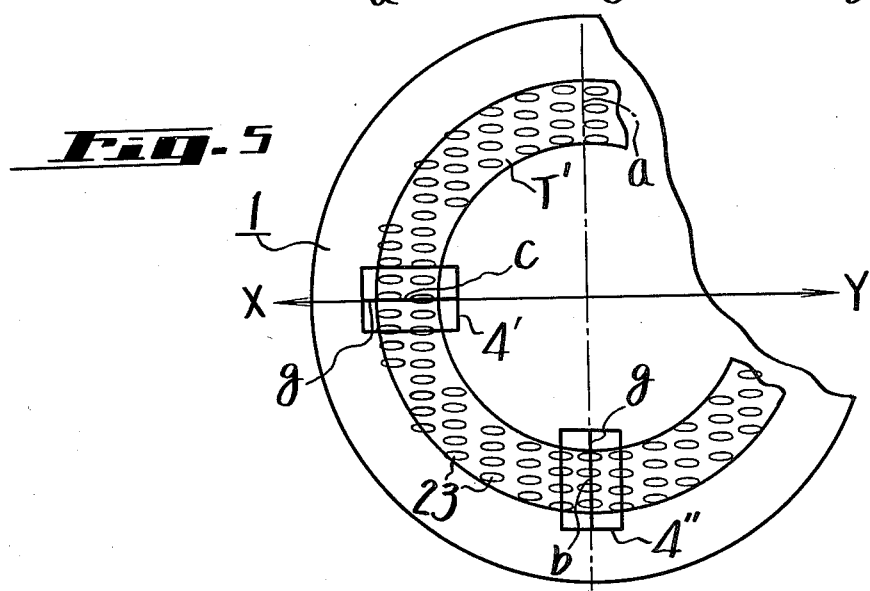
FIG. 5 shows a fragment of a magnetic recording disk according to the present invention with a section thereof enlarged to illustrate the arrangement of magnetic particles.

The advantage of this change in the amplitude response is especially useful in connection with the disk 1 shown in FIG. 5. As depicted there, the magnetic particles 23 coated onto the disk have an acicular shape and are all aligned in a direction, which is arbitrarily identified as the X–Y direction. The orientation of the magnetic particles is related to the locations of the tracks sections $T_{1a}$ and the semicircular trace T in FIG. 3 such that when the transducer 4 occupies a position indicated by the reference character 4' in FIG. 5 so that the gap $g$ of the transducer is directly aligned with the longitudinal dimension of the particles 23, the trace T most closely coincides with track section $T_{1a}$, the amplitude response of the signal when the transducer is at the position 4' corresponds to the response at the points $c$ in the graph in FIG. 4B. When the transducer 4 is in the position 4" so that its gap $g$ is directly perpendicular to the longitudinal dimension of the acicular particles 23, as shown in FIG. 5, the semicircular trace T in FIG. 3 is farthest from coinciding with the track section $T_{1a}$. This corresponds to the right-hand end of the graph in FIG. 4B and results in an amplitude response as shown by the point $b$ on that graph. It also corresponds to the amplitude response of the point $a$. For that reason, the positions $a$ and $b$ at right angles to the X–Y direction are identified in FIG. 5 by the same letters $a$ and $b$ used in the graph in FIG. 4B.

With the magnetic particles 23 aligned as shown in FIG. 5, when a signal is recorded by the transducer 4 as the disk 1 rotates, the magnetic flux produced by the transducer at the position 4' passes through the width direction of the acicular magnetic particles 23 and produces a lower level of magnetization of these particles at the center position $c$ than at the end positions $a$ and $b$. At both of the ends $a$ and $b$ of the track T', which may correspond to the trace T for one field in FIG. 3, the magnetic flux from the transducer in the position 4" passes through the longitudinal direction of the particles 23 so that their level of magnetization is much higher than at the center $c$ of the one field signal. This is indicated by the broken line 21 in FIG. 6. The combination of this effect on the magnetization of the particles 23 with the response characteristic shown in FIG. 4B can be made to equalize the response around the semicircle as indicated by the dotted line 22 in FIG. 6. This is clearly much improved with respect to the response that would be achieved if the particles 23 were not oriented. The latter response is shown in FIG. 4B and is reproduced as the line 20 in the graph in FIG. 6.

Figure 6:
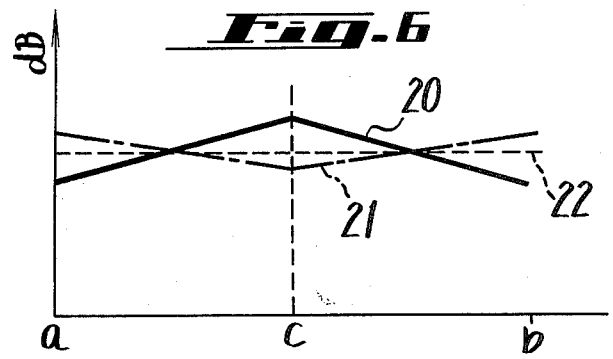
FIG. 6 is a graph showing the amplitude response characteristics of reproduced output signals from the apparatus of FIG. 1 and corresponding signals from prior art apparatus for comparison.

The signal, which has been corrected substantially linearly as indicated by the dotted line 22 in FIG. 6, is then applied to the transducer 14 to be recorded on the disk 1 along the auxiliary track 15. Although the output level of the signal recorded on the track 15 may be considered as subject to the same fluctuations just described, it should be noted that the track 15 is near the outer edge of the disk 1 and has such a high signal-to-noise ratio that its output signal can be subjected to a limiting action to remove the effect of such fluctuation.

The orientation procedure of the present invention can also be utilized if the signals recorded on the disk 1 are recorded in a series of co-axial tracks and are reproduced by a transducer that scans the tracks in succession by following a spiral path to reproduce a continuous picture.

Figure 7:
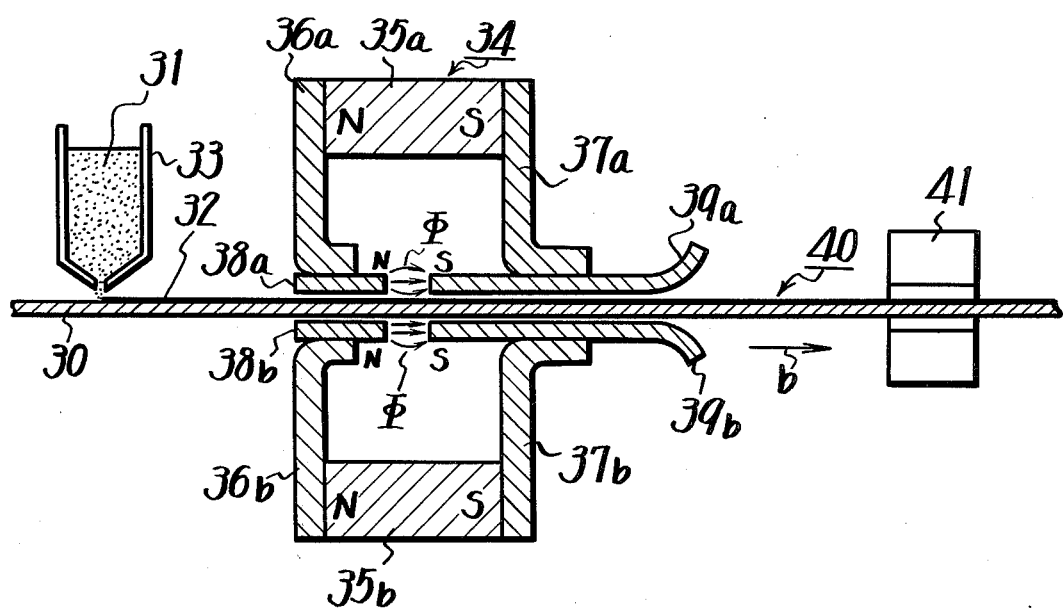
FIG. 7 is a schematic representation, partly in cross section, of apparatus for producing the magnetic recording medium according to the present invention.

FIG. 7 shows apparatus for applying the magnetic particles to the disk material. A non-magnetic carrier web 30, such as a thin, cellulose acetate film is fed from a stock roll (not shown) into the coding section of the apparatus. One surface of the web 30 is coated with a layer 32 that includes ferromagnetic acicular particles 31. The particles 31 are fed from a crucible or container 33 in which the magnetic acicular particles are uniformly dispersed in a flexible binder as magnetically anisotropic particles.

The web 30 coated with the magnetic particle layer 32 from the crucible 33 then passes through a magnetizing apparatus 34 along the direction indicated by an arrow $h$. The magnetizing apparatus 34 comprises 2 separate strong permanent magnets 35a, 35b, and yokes 36a, 36b, and 37a, 37b coupled to the magnets 35a and 35b. The yokes have pole pieces 38a, 38b, and 39a, 39b adjacent to and on opposite sides of the web 30. Furthermore, there is a space between the pole pieces 38a and 39a and the pole pieces 38b and 39b so that there is substantially uniform magnetic flux $\phi$ extending parallel to the surface of the web 30 and the coating 32. As a result of the flux, the acicular, magnetic particles 31 of the coating 32 are oriented uniformly in one direction as the web passes through the apparatus.

The binder in which the particles are dispersed has sufficient fluidity to allow the acicular magnetic particles 31 to be oriented easily by the magnetic flux, but thereafter, the binder is hardened by the residual induced magnetic forces so that the particles 31 are held in the oriented direction. Suitable, flexible binders for use in the present invention are, for example, plasticized, cellulose esters or ethers, polyvinyl, resins, and the like. The resulting magnetic sheet 40 that has passed through the magnetizing apparatus 34 is fed through an oven 41 to evaporate a volatile, solvent in the binder and thus harden the binder. Thereafter, the magnetic sheet 40 can be cut into the disks 1.

It will be apparent that many variations and modifications may be made in the foregoing structures without departing from the true scope of this invention.

What is claimed is:

1. A video signal recording disk formed of a thin, non-magnetic carrier sheet having magnetically anisotropic, ferromagnetic particles bonded to said carrier sheet and magnetically oriented parallel to each other and to the surface of said sheet having a video signal divided into fields recorded in substantially circular tracks on said disk wherein one field is recorded in substantially one-half of a circular track, the central portion of said one field being recorded substantially perpendicular to the direction of parallel alignment of said particles.

2. A method of recording a video signal divided into fields in substantially circular tracks on a magnetic recording disk formed of a thin, non-magnetic carrier sheet having magnetically anisotropic, ferromagnetic particles bonded to said carrier sheet and magnetically oriented parallel to each other and to the surface of said sheet comprising the step of recording one field during substantially one-half of a rotation of said disk, the central portion of said field being recorded substantially perpendicular to the direction of parallel alignment of said particles.

3. Magnetic recording and reproducing apparatus for use with a magnetic recording disk comprising a thin, non-magnetic, carrier sheet and magnetically anisotropic, ferromagnetic particles firmly bonded thereto, the particles being magnetically oriented substantially parallel to each other and to the surface of the disk, said apparatus comprising:

transducer means to record video signals on a first track on said disk and to playback signals recorded on said track; and means to move said transducer means along a second track generally similar to said first track said second track including some portions that coincide more closely with associated portions of said first track than do other portions of said second track, the portions of said first and second tracks that coincide most closely with each other being located at an area whereat said video signals are recorded substantially perpendicular to the direction of orientation of said particles.

4. The apparatus according to claim 3 wherein said first track is generally circularly curved and said video signals comprise periodic field signals, each of said field signals being recorded on a predetermined semicircular section of said first track.

5. The apparatus according to claim 4 wherein said means to move said transducer means causes said transducer means to trace out a generally circularly curved second track that coincides most closely with said first track substantially at a center portion of one of said semicircular sections of said first track.

6. The apparatus according to claim 5 wherein said magnetic particles are oriented substantially perpendicular to the center portion of said semicircular sections.

7. The apparatus of claim 3 wherein said means to move said transducer means causes said transducer means normally to scan said first track to reproduce signals thereon along the entire length of said first track in a first operative mode, and alternatively to scan said first track with a pre-set phase relationship which is phase shifted by $\pi/2$ with respect to the orientation of said first track on said disk in a second operative mode.

8. The apparatus according to claim 4 wherein said means to move said transducer means causes said transducer means to record said television signals along a continuous first spiral track and causes said transducer means to trace out a second substantially spiral track, said second track crossing the center portion of one of said semicircular portions of said first track.

9. The apparatus according to claim 8 comprising, in addition:
   A. a recording transducer connected to said transducing means during playback of one of said semicircular portions of said first track to re-record the video signal from said one semicircular portion to a substantially semicircular portion of a third track;
   B. a playback transducer to play back signals recorded on said third track; and
   C. means to connect said playback transducer selectively to said recording transducer to re-record video signals on the remaining semicircular portion of said third track, whereby said third track has recorded thereon the same one of said field signals in each semicircular portion of said third track.

* * * * *